US008687751B1

(12) United States Patent
Lee et al.

(10) Patent No.: US 8,687,751 B1
(45) Date of Patent: Apr. 1, 2014

(54) MULTIPLE-INPUT MULTIPLE-OUTPUT RECEIVERS USING SUCCESSIVE INTERFERENCE CANCELLATION BASED ON CYCLIC REDUNDANCY CHECK

(75) Inventors: Jungwon Lee, San Diego, CA (US); Yakun Sun, Sunnyvale, CA (US); Jiwoong Choi, Sunnyvale, CA (US); Leilie Song, Sunnyvale, CA (US); Adina Matache, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 265 days.

(21) Appl. No.: 13/047,056

(22) Filed: Mar. 14, 2011

Related U.S. Application Data

(60) Provisional application No. 61/320,456, filed on Apr. 2, 2010.

(51) Int. Cl.
*H04B 7/10* (2006.01)

(52) U.S. Cl.
USPC ........... 375/347; 375/346; 375/316; 375/260; 375/262; 375/267; 375/348; 370/304; 370/205; 370/207; 370/208; 370/209

(58) Field of Classification Search
USPC ......... 375/347, 346, 316, 260, 262, 267, 348; 370/304, 205, 207, 208, 209, 210
See application file for complete search history.

(56) References Cited

U.S. PATENT DOCUMENTS

| 6,584,115 | B1 | 6/2003 | Suzuki | |
|---|---|---|---|---|
| 8,149,957 | B2 | 4/2012 | Oh et al. | |
| 8,185,798 | B2 | 5/2012 | Oteri et al. | |
| 8,335,286 | B2 | 12/2012 | Mergen et al. | |
| 2005/0063378 | A1* | 3/2005 | Kadous | 370/389 |
| 2008/0297415 | A1* | 12/2008 | Berens et al. | 342/372 |
| 2009/0225889 | A1* | 9/2009 | Tsai et al. | 375/267 |
| 2011/0268019 | A1 | 11/2011 | Tang et al. | |

* cited by examiner

*Primary Examiner* — Zewdu Kassa

(57) ABSTRACT

A system including a first receiver module and a first interference canceller module. The first receiver module generates a first set of decoded codewords by decoding codewords in a received signal and determines if any of the first set of decoded codewords fails cyclic redundancy check (CRC). The first interference canceller module generates a second signal based on a first decoded codeword from the first set of decoded codewords when (i) any of the first set of decoded codewords fails CRC and (ii) the first decoded codeword passes CRC. By subtracting the second signal from the first signal, the first interference canceller module (i) cancels interference of a first codeword, which corresponds to the first decoded codeword, on a second set of codewords, which includes the plurality of codewords and excludes the first codeword and (ii) generates a third signal, which includes the second set of codewords.

12 Claims, 11 Drawing Sheets

| Iteration number i | S(i) | Cancelled signal | Codeword 1 | Codeword 2 | Codeword 3 | Codeword 4 | Codeword 5 | # of decoding |
|---|---|---|---|---|---|---|---|---|
| 1 | {1,3,5} | y | F (Fail) | P (Pass) | F | P | F | 5 |
| 2 | {1,3} | y-$H_2x_2$-$H_4x_4$ | F | x (No decoding) | F | x | P | 3 |
| 3 | {1} | y-$H_2x_2$-$H_4x_4$-$H_5x_5$ | F | x | P | x | x | 2 |
| 4 | {1} | y-$H_2x_2$-$H_4x_4$-$H_5x_5$-$H_3x_3$ | F | x | x | x | x | 1 |
| Final | {1} | | F | P | P | P | P | Total: 11 |

End of decoding

| k | | Trigger index | | Decoding outcome | S(i) | Cancelled signal | Code word 1 | Code word 2 | Code word 3 | Code word 4 | Code word 5 | # of decoding |
|---|---|---|---|---|---|---|---|---|---|---|---|---|
| Before | After | Before | After | | | | | | | | | |
| 1 | 2 | 0 | 0 | F | {1,2,3,4,5} | y | F (Fail) | | | | | 1 |
| 2 | 3 | 0 | 3 | P | {1,3,4,5} | y | | P (Pass) | | | | 1 |
| 3 | 4 | 3 | 3 | F | {1,3,4,5} | y-H₂x₂ | | | F | | | 1 |
| 4 | 5 | 3 | 5 | P | {1,3,5} | y-H₂x₂ | | | | | P | 1 |
| 5 | 1 | 5 | 1 | P | {1,3} | y-H₂x₂-H₄x₄ | | | | P* | | 1 |
| 1 | 3 | 1 | 1 | F | {1,3} | y-H₂x₂-H₄x₄-H₅x₅ | F | | | | | 1 |
| 3 | 1 | 1 | 1 | P | {1} | y-H₂x₂-H₄x₄-H₅x₅ | | | P | | | 1 |
| 1 | ⓵ | 1 | ⓵ | Ⓕ | {1} | y-H₂x₂-H₄x₄-H₅x₅-H₃x₃ | F | P | P | P | P | Total: 8 |

If '⓵' = '⓵' when 'Ⓕ' then End of decoding

MULTIPLE-INPUT MULTIPLE-OUTPUT RECEIVERS USING SUCCESSIVE INTERFERENCE CANCELLATION BASED ON CYCLIC REDUNDANCY CHECK

CROSS-REFERENCE TO RELATED APPLICATIONS

This application claims the benefit of U.S. Provisional Application No. 61/320,456, filed on Apr. 2, 2010. The disclosure of the above application is incorporated herein by reference in its entirety.

FIELD

The present disclosure relates generally to communication systems and more particularly to multiple-input multiple-output receivers using successive interference cancellation based on cyclic redundancy check.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many wireless communication systems use multiple transmit antennas and receive antennas and are modeled as multiple-input multiple-output (MIMO) systems. MIMO systems can increase throughput by transmitting multiple streams over multiple transmit antennas. Examples of MIMO wireless communication systems (hereinafter MIMO systems) include wireless fidelity (WiFi) systems, Worldwide Interoperability for Microwave Access (WiMAX) systems, Long Term Evolution (LTE) systems, and so on.

In MIMO systems, transmitters may generate multiple streams using one or more channel encoders. For example, in WiMAX MIMO systems using two transmit antennas, transmitters may generate two streams using one channel encoder. In LTE MIMO systems using two transmit antennas, transmitters may generate two streams using two channel encoders.

Receivers of most wireless communication systems typically use cyclic redundancy check (CRC) codes to detect errors at physical layer (PHY) or medium access control (MAC) layer. For example, CRC codes are used to determine whether received packets are decoded correctly. Additionally, receivers may use successive interference cancellation (SIC) when multiple streams are generated using multiple channel encoders.

SUMMARY

A system includes a first receiver module and a first interference canceller module. The first receiver module generates a first set of decoded codewords by decoding codewords in a received signal and determines if any of the first set of decoded codewords fails cyclic redundancy check (CRC). The first interference canceller module generates a second signal based on a first decoded codeword from the first set of decoded codewords when (i) any of the first set of decoded codewords fails CRC and (ii) the first decoded codeword passes CRC. By subtracting the second signal from the first signal, the first interference canceller module (i) cancels interference of a first codeword, which corresponds to the first decoded codeword, on a second set of codewords, which includes the plurality of codewords and excludes the first codeword and (ii) generates a third signal, which includes the second set of codewords.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 6B is an example showing decoding of five codewords using a serial SIC receiver according to the method shown in FIG. 6A.

DESCRIPTION

Figure 1:
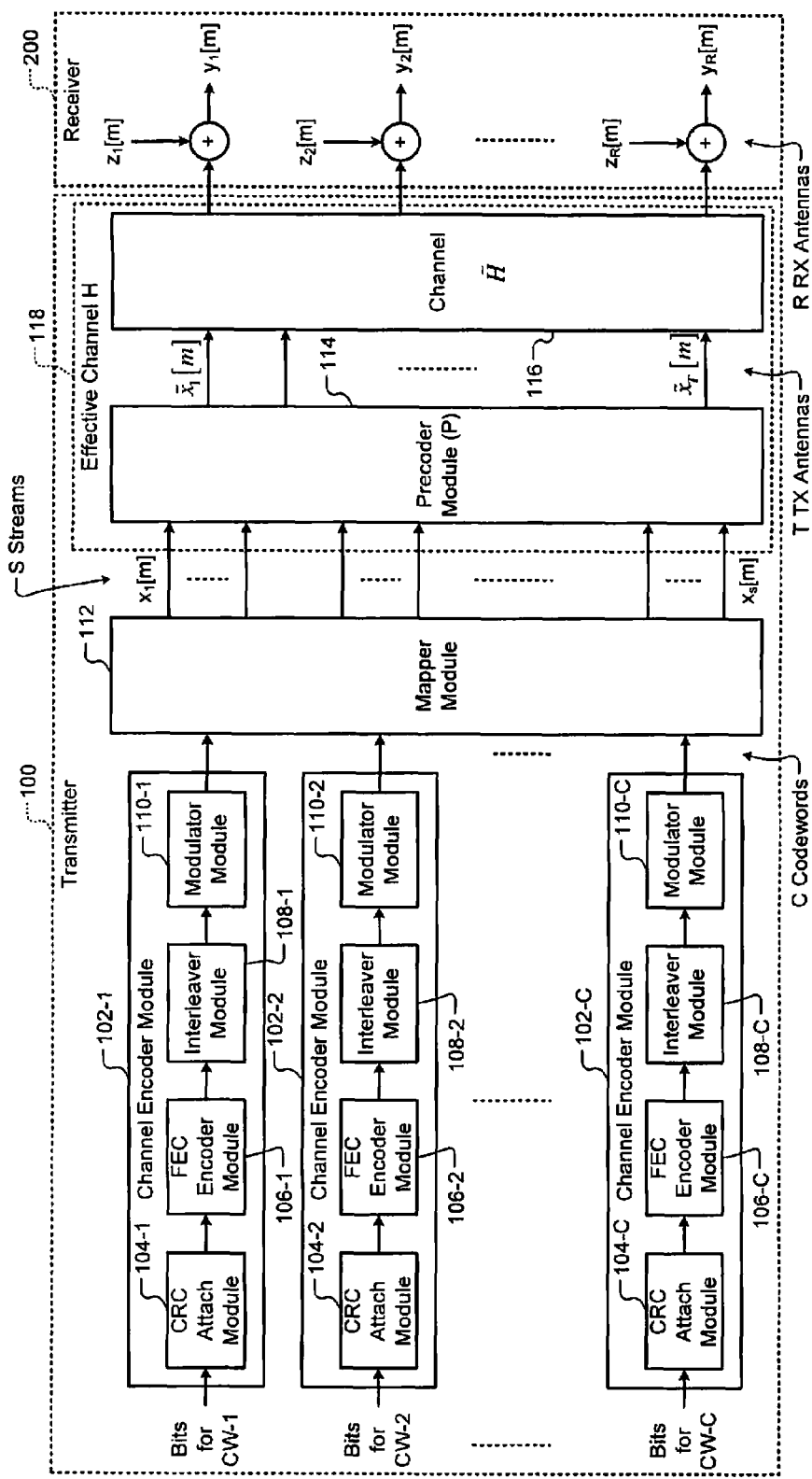
FIG. 1 is a functional block diagram of system including a wireless transmitter having a plurality of transmit antennas and a wireless receiver having a plurality of receive antennas.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure relates to multiple-input multiple-output (MIMO) receivers using successive interference cancellation (SIC) based on cyclic redundancy check (CRC). Two types of MIMO SIC receivers are disclosed: a parallel SIC receiver and a serial SIC receiver are described. The disclosure is organized as follows. First, a system model for a transmitter and channel and a system model for a received signal are introduced. Subsequently, a non-SIC receiver and a general SIC receiver are described. Thereafter, the parallel SIC receiver and the serial SIC receiver utilizing CRC check are described.

Referring now to FIG. 1, a system model for a transmitter and channel is shown. A transmitter 100 generates multiple streams (e.g., S streams, where S is an integer greater than 1) using multiple channel encoders. The transmitter 100 transmits the multiple streams via multiple transmit antennas (e.g., T transmit antennas, where T is an integer greater than 1). A receiver 200 receives the multiple streams via multiple receive antennas (e.g., R receive antennas, where R is an integer greater than 1).

The transmitter 100 includes a plurality of channel encoder modules 102-1, 102-2, . . . , 102-C (collectively channel encoder modules 102), where C is an integer greater than 1. The channel encoder modules 102 receive information bits of C codewords and generate C codewords, respectively. That is, the channel encoder module 102-1 receives information bits of a codeword CW-1 and generates the codeword CW-1; the channel encoder 102-2 module receives information bits of a codeword CW-2 and generates the codeword CW-2; and so on. The channel encoder module 102-C receives information bits of a codeword CW-C and generates the codeword CW-C.

Each of the channel encoder modules 102 includes a CRC attach module, a forward error correction (FEC) encoder module, an interleaver module, and a modulator module. For example, the channel encoder module 102-1 includes a CRC attach module 104-1, a FEC encoder module 106-1, an interleaver module 108-1, and a modulator module 110-1. The channel encoder module 102-2 includes a CRC attach module 104-2, a FEC encoder module 106-2, an interleaver module 108-2, and a modulator module 110-2, and so on. The channel encoder module 102-C includes a CRC attach module 104-C, a FEC encoder module 106-C, an interleaver module 108-C, and a modulator module 110-C.

The CRC attach modules 104-1, 104-2, . . . , and 104-C are collectively referred to as CRC attach modules 104. The FEC encoder modules 106-1, 106-2, . . . , and 106-C are collectively referred to as FEC encoder modules 106. The interleaver modules 108-1, 108-2, . . . , and 108-C are collectively referred to as interleaver modules 108. The modulator modules 110-1, 110-2, . . . , and 110-C are collectively referred to as modulator modules 110.

The CRC attach modules 104 use a CRC code to generate CRC information for the codewords and attach the CRC information to the codewords. That is, the CRC attach module 104-1 generates CRC information for the codeword CW-1 using the CRC code and attaches the CRC information to the codeword CW-1; the CRC attach module 104-2 generates CRC information for the codeword CW-2 using the CRC code and attaches the CRC information to the codeword CW-2, and so on. The CRC attach module 104-C generates CRC information for the codeword CW-C using the CRC code and attaches the CRC information to the codeword CW-C.

The FEC encoder modules 106 encode the information bits and the CRC information of the codewords using a forward error-correction code (FEC). That is, the FEC encoder module 106-1 encodes the information bits and the CRC information of the codeword CW-1 using the FEC; the FEC encoder module 106-2 encodes the information bits and the CRC information of the codeword CW-2 using the FEC, and so on. The FEC encoder module 106-C encodes the information bits and the CRC information of the codeword CW-C of the codeword CW-C using the FEC.

The interleaver modules 108 interleave outputs of the FEC encoder modules 106. That is, the interleaver module 108-1 interleaves an output of the FEC encoder module 106-1; the interleaver module 108-2 interleaves an output of the FEC encoder module 106-2, and so on. The interleaver module 108-C interleaves an output of the FEC encoder module 106-C.

The modulator modules 110 modulate outputs of the FEC encoder modules 106 using a suitable modulation and generate C modulated codewords. That is, the modulator module 110-1 modulates an output of the interleaver module 108-1 and generates a first modulated codeword; the modulator module 110-2 modulates an output of the interleaver module 108-2 and generates a second modulated codeword, and so on. The modulator module 110-C modulates an output of the interleaver module 108-C and generates a $C^{th}$ modulated codeword.

The transmitter 100 further includes a mapper module 112 and a precoder module 114. The mapper module 112 maps the C modulated codewords onto the S streams and generates the S streams. $S_n$ denotes the number of streams in a codeword CW-n. The precoder module 114 maps the S streams onto the T transmit antennas and generates transmit signals.

In MIMO systems, S is greater than or equal to C, and T and R are greater than or equal to S. In systems using super-position coding, S is less than C since multiple codewords are transmitted in a stream. Throughout the present disclosure, MIMO systems are used for example only. The teachings of the present disclosure can also be applied to systems using super-position coding. For example, the mapper module 112 uses a matrix multiplication to map the C modulated codewords onto the S streams. The matrix multiplication can also be used in systems using super-position coding.

The transmitter 100 transmits the transmit signals via the T transmit antennas through a channel 116 denoted by $\tilde{H}$. The precoder module 114 and the channel 116 are collectively referred to as an effective channel 118 denoted by H. The receiver 200 receives signals (referred to as received signals) via the R receive antennas.

A received signal y received by the receiver 200 via the R receive antennas can be mathematically expressed using the following equation:

$$y = Hx + z = \sum_{i=1}^{C} H_i x_i + z$$

$$\text{where } y = \begin{bmatrix} y_1 \\ y_2 \\ \vdots \\ y_R \end{bmatrix}, H = \begin{bmatrix} h_{1,1} & h_{1,2} & \cdots & h_{1,S} \\ h_{2,1} & h_{2,2} & \cdots & h_{2,S} \\ \vdots & \vdots & \ddots & \vdots \\ h_{R,1} & h_{R,2} & \cdots & h_{R,S} \end{bmatrix} = \tilde{H}P,$$

$$x = \begin{bmatrix} x_1 \\ x_2 \\ \vdots \\ x_S \end{bmatrix}, \text{ and } z = \begin{bmatrix} z_1 \\ z_2 \\ \vdots \\ z_R \end{bmatrix}.$$

In the above equation, $y_1, y_2, \ldots,$ and $y_R$ are signals received by the R antennas. H, the effective channel, is a R×S matrix and is a product of a R×T channel matrix of the channel $\tilde{H}$ and a T×S matrix representing mapping performed by the precoder module 114. Additionally, x is the transmit signal including transmit symbols $x_1, x_2, \ldots,$ and $x_S$; and z is the circularly symmetric Gaussian noise in the effective channel H. While x is the transmit signal transmitted at time m, a time index m is omitted for notational convenience since the receiver 200 processes the received signal y on a symbol-by-symbol basis (or on a per sub-carrier basis in case of orthogonal frequency division multiplexing (OFDM)).

In other words, the received signal with grouping of streams for each codeword is expressed as $$y = Hx + z = \sum_{i=1}^{C} H_i x_i + z.$$

A transmit vector for streams in a codeword CW-n is expressed by the equation $$x_n = \begin{bmatrix} x_{1,n} \\ x_{2,n} \\ \vdots \\ x_{S_n,n} \end{bmatrix}.$$

The effective channel for the streams in the codeword CW-n is expressed by the equation $$H_n = \begin{bmatrix} h_{1,1,n} & h_{1,2,n} & \cdots & h_{1,S_n,n} \\ h_{2,1,n} & h_{2,2,n} & \cdots & h_{2,S_n,n} \\ \vdots & \vdots & \ddots & \vdots \\ h_{R,1,n} & h_{R,2,n} & \cdots & h_{R,S_n,n} \end{bmatrix} = \tilde{H}P_n,$$

where $P_n$ is a T×$S_n$ precoding matrix for the streams in the codeword CW-n.

Figure 2:
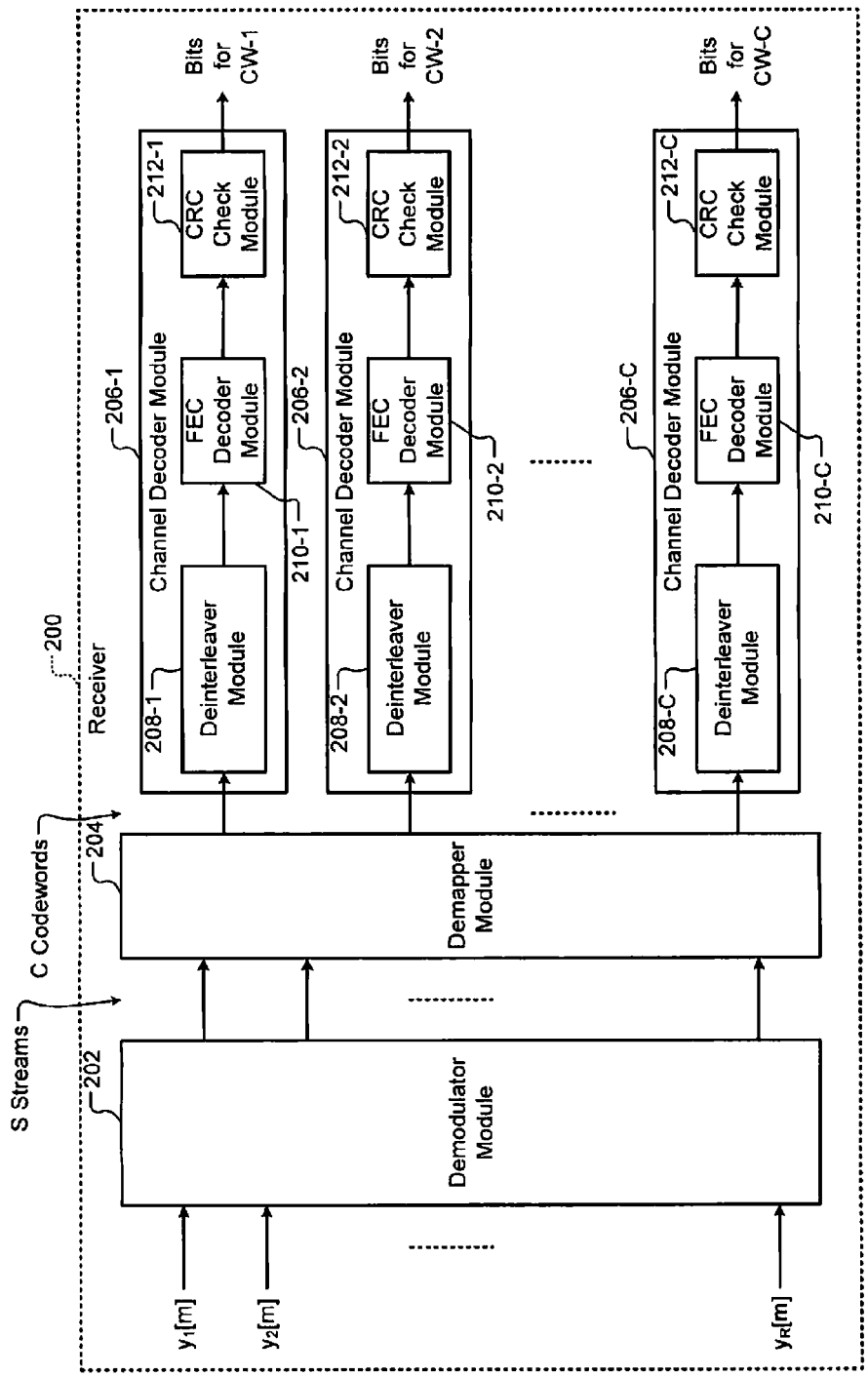
FIG. 2 is a functional block diagram of a receiver that does not utilize successive interference cancellation (SIC)

Referring now to FIG. 2, an example of the receiver 200 is shown. The receiver does not use successive interference cancellation (SIC). The receiver 200 includes a demodulator module 202, a demapper module 204, and a plurality of channel decoder modules 206-1, 206-2, ..., and 206-C (collectively channel decoder modules 206).

The demodulator module 202 demodulates the received signals received via the R receive antennas. For example, the demodulator module 202 may use a maximum likelihood (ML) demodulator to generate a log likelihood ratio (LLR) for each stream. Alternatively, the demodulator module 202 may use a modulator based on a linear equalizer (e.g., zero-forcing (ZF) equalizer or linear minimum mean square error (MMSE) equalizer) to generate the LLR for each stream.

An LLR is a logarithm of a ratio of a first probability to a second probability. The first probability is a probability that the transmitted encoded bit is a 1 given the received signal. The second probability is a probability that the transmitted encoded bit is a 0 given the received signal. The transmitted encoded bit is a 1 if the LLR is +∞. The transmitted encoded bit is a 0 if the LLR is −∞. Determining whether the received encoded bit is a 1 or a 0 is uncertain if the LLR is nearly 0.

The demapper module 204 demaps the S streams to C codewords and generates LLRs for C codewords. The demapper module 204 directs the LLR for each encoded bit to one of the channel decoder modules 206. The channel decoder modules 206 decode the C codewords and generate information bits of the C codewords, respectively. That is, the channel decoder module 206-1 receives the LLRs for codeword CW-1 from the demapper module 204 and generates information bits of the codeword CW-1; the channel decoder module 206-2 receives the LLRs for codeword CW-2 from the demapper module 204 and generates information bits of the codeword CW-2; and so on. The channel decoder module 206-C receives the LLRs for codeword CW-C from the demapper module 204 and generates information bits of the codeword CW-C.

Each of the channel decoder modules 206 includes a deinterleaver module, a FEC decoder module, and a CRC check module. For example, the channel decoder module 206-1 includes a deinterleaver module 208-1, a FEC decoder module 210-1, and a CRC check module 212-1. The channel decoder module 206-2 includes a deinterleaver module 208-2, a FEC decoder module 210-2, and a CRC check module 212-2, and so on. The channel decoder module 206-C includes a deinterleaver module 208-C, a FEC decoder module 210-C, and a CRC check module 212-C.

The deinterleaver modules 208-1, 208-2, ..., and 208-C are collectively referred to as deinterleaver modules 208. The FEC decoder modules 210-1, 210-2, ..., and 210-C are collectively referred to as FEC decoder modules 210. The CRC check modules 212-1, 212-2, ..., and 212-C are collectively referred to as CRC check modules 212.

The deinterleaver modules 208 deinterleave the codewords received from the demapper module 204. The FEC decoder modules 210 decode the outputs of the deinterleave modules 208 and generate information bits of the codewords. The FEC decoder modules 210 correct most errors using the forward error-correction code (FEC) used by the transmitter 100. To detect any uncorrected errors, the CRC check modules 212 perform a CRC operation on the information bits. If no error is detected, the receiver 200 sends an acknowledgement to the transmitter 100 that the transmitted data is received correctly. If an error is detected, the receiver 200 transmits a retransmission request to the transmitter 100 to retransmit the data that was received incorrectly.

Figure 3A:
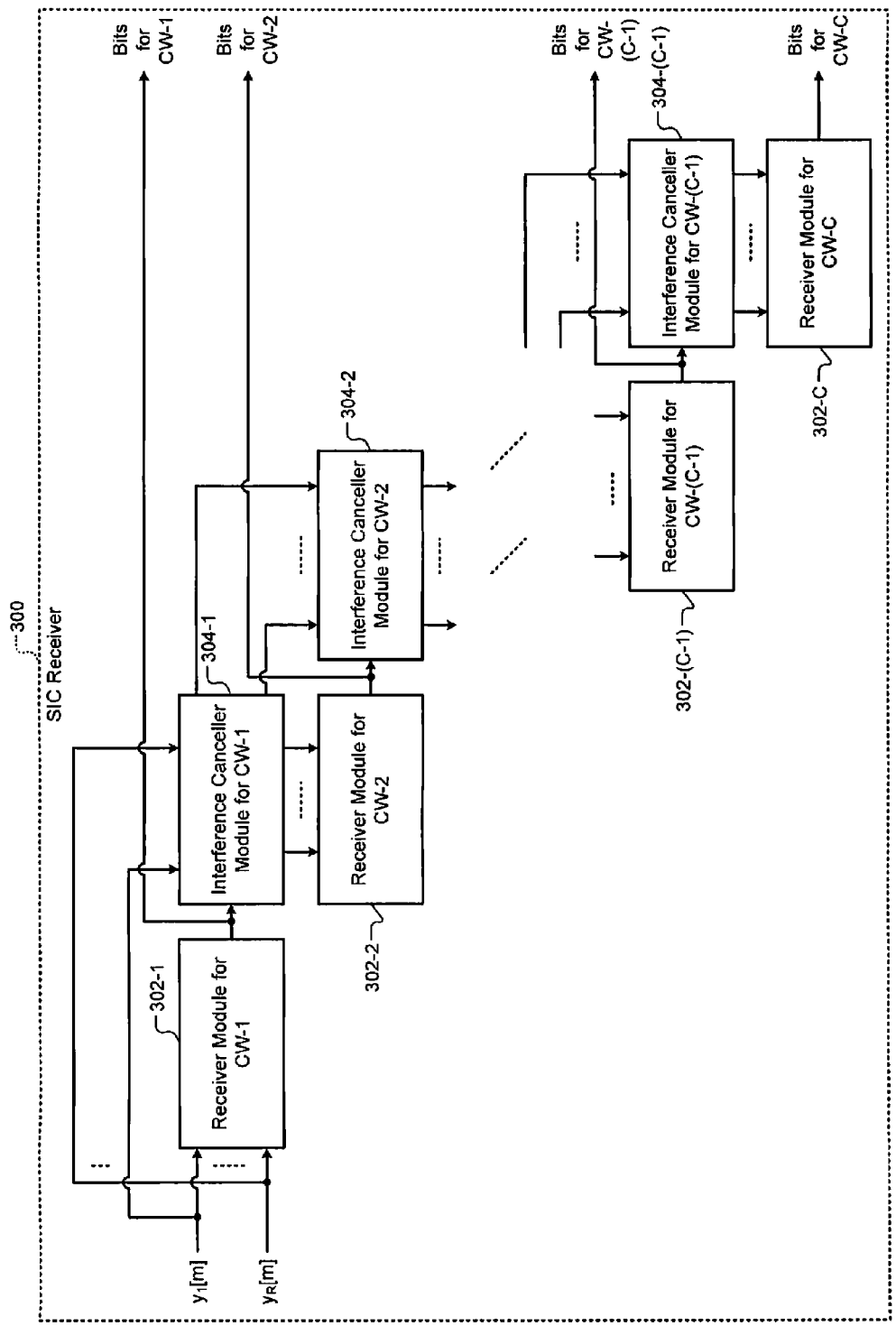
FIG. 3A is a functional block diagram of a receiver that performs successive interference cancellation (SIC) using a plurality of receiver module and a plurality of interference cancellation modules.
Figure 3B:
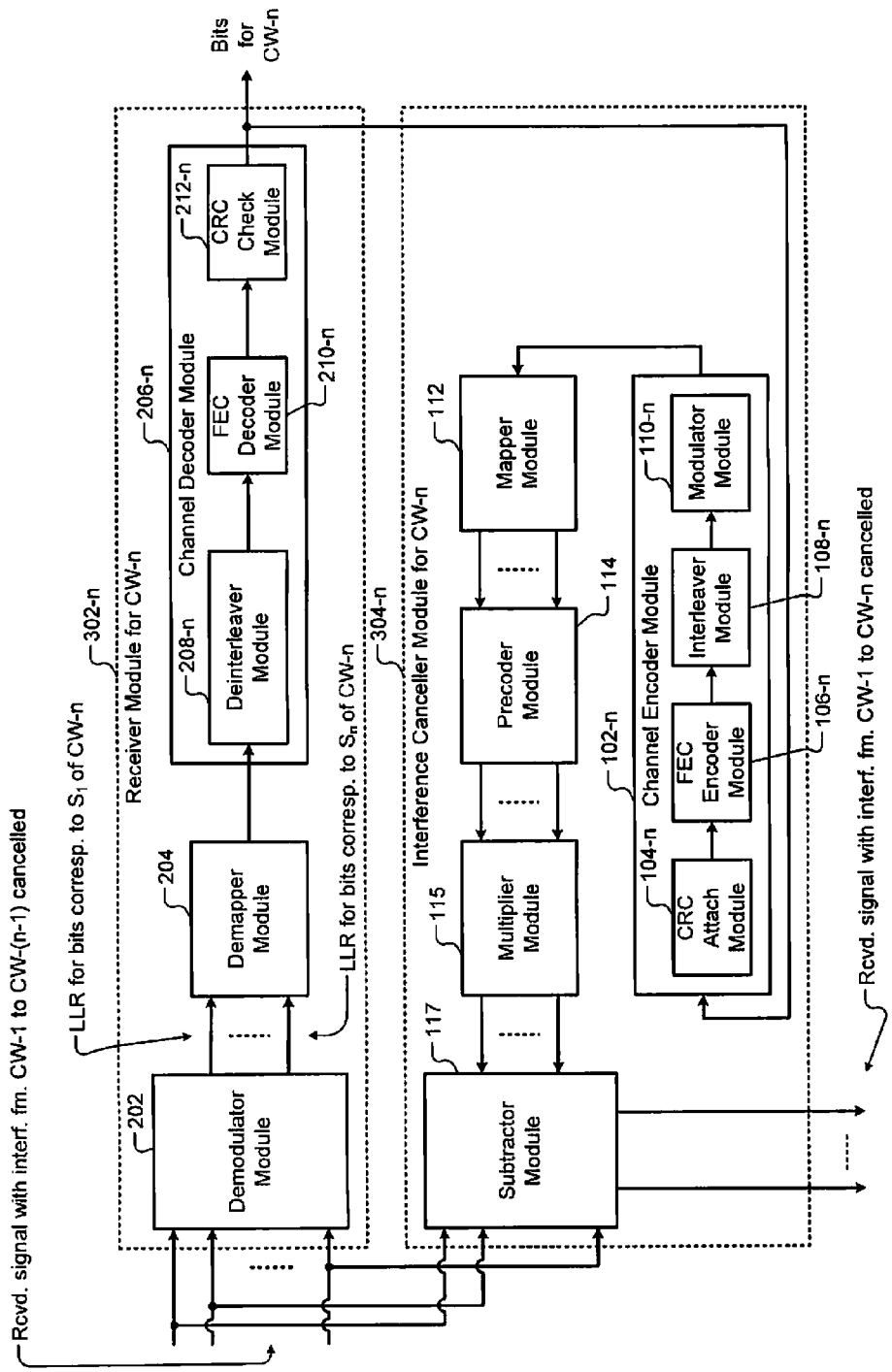
FIG. 3B is a functional block diagram showing details of a receiver module and an interference cancellation module of the receiver of FIG. 3A.

Referring now to FIGS. 3A and 3B, an example of a receiver 300 that uses successive interference cancellation (SIC) is shown. In FIG. 3A, the receiver 300 includes a plurality of receiver modules 302-1, 302-2, ..., and 302-C (collectively receiver modules 302) and a plurality of interference canceller modules 304-1, 304-2, ..., and 304-(C−1) (collectively interference canceller modules 304). In general, to decode C codewords from a signal received by the receiver 300, the receiver 300 includes C receiver modules 302 and (C−1) interference canceller modules 304.

The receiver module 302-1 receives received signals $y_1, y_2, \ldots,$ and $y_R$. The receiver module 302-1 decodes codeword CW-1. The interference canceller module 304-1 cancels interference caused by the codeword CW-1 on codewords CW-2 through CW-C as explained below with reference to FIG. 3B. The interference canceller module 304-1 generates a first output that does not include interference of codeword CW-1 on codewords CW-2 through CW-C.

The receiver module 302-2 receives the first output of the interference canceller module 304-1 and decodes codeword CW-2 from the first output. The interference canceller module 304-2 cancels interference caused by the codeword CW-2 on codewords CW-3 through CW-C and generates a second output that does not include interference of codewords CW-1 and CW-2 on codewords CW3 through CW-C, and so on.

The receiver module 302-(C−1) receives an output of an interference canceller module 304-(C−2) and decodes codeword CW-(C−1). The interference canceller module 304-(C−1) cancels interference caused by codeword CW-(C−1) on codeword CW-C and generates an output that does not include interference of codewords CW-1 through CW-(C−1) on codeword CW-C. The receiver module 302-C receives the output of the interference canceller module 304-(C−1) and decodes the codeword CW-C.

In FIG. 3B, one of the receiver modules 302 (e.g., receiver module 302-n for codeword CW-n) and one of the interference canceller modules 304 (e.g., interference canceller module 304-n for codeword CW-n) are shown. The receiver module 302-n includes the demodulator module 202, the demapper module 204, and a channel decoder module 206-n.

The channel decoder module 206-n is similar to the channel decoder modules 206. The channel decoder module 206-n includes a deinterleaver module 208-n, a FEC decoder module 210-n, and a CRC check module 212-n, which are similar to the deinterleaver modules 208, the FEC decoder modules 210, and the CRC check modules 212, respectively. In some implementations, the CRC check module 212-n may be optional in the channel decoder module 206-n.

The receiver module 302-n receives the received signals $y_1, y_2, \ldots,$ and $y_R$ if n=1. Alternatively, the receiver module 302-n receives an output of an interference canceller module 304-(n−1) if n is not equal to 1. In other words, when n is not equal to 1, the receiver module 302-n receives the received signals without the interference from codewords CW-1 through CW-(n−1). That is, when n is not equal to 1, the receiver module 302-n receives signals with interference from codewords CW-1 through CW-(n−1) cancelled from the received signals.

The demodulator module 202 demodulates streams 1 through $S_n$ of codeword CW-n and generates bit LLRs corresponding to each of the streams 1 through $S_n$ of codeword CW-n. The demapper module 204 operates as described with reference to FIG. 2. Based on the output of the demapper module 204, the channel decoder module 206-n decodes codeword CW-n from inputs received by the receiver module 302-n. The channel decoder module 206-n outputs information bits of the codeword CW-n.

The interference canceller module 304-n receives the information bits of codeword CW-n. The interference canceller module 304-n includes a channel encoder module 102-n, which is similar to the channel encoder modules 102 shown in FIG. 1, the mapper module 112, the precoder module 114, a multiplier module 115, and a subtractor module 117.

The channel encoder module 102-n includes a CRC attach module 104-n, a FEC encoder module 106-n, an interleaver module 108-n, and a modulator module 110-n, which are similar to the CRC attach modules 104, the FEC encoder modules 106, the interleaver modules 108, and the modulator modules 110, respectively. The CRC attach module 104-n may be optional in the channel encoder module 102-n and is included in the channel encoder module 102-n when the CRC check module 212-n is included in the channel decoder module 206-n.

The channel encoder module 102-n re-encodes the information bits of codeword CW-n decoded by the channel decoder module 206-n. The re-encoding can be performed irrespective of whether the CRC check module 212-n detects an error in the codeword CW-n decoded by the FEC decoder module 210-n. Additionally, the receiver 300 sends an acknowledgement to the transmitter indicating that the transmitted data is received correctly if no error is detected, and the receiver 300 transmits a retransmission request to the transmitter to retransmit the data that was received incorrectly if an error is detected.

The mapper module 112 and the precoder module 114 operate as described with reference to FIG. 1. Based on the output of the mapper module 112, the precoder module 114 performs stream-to-transmit antenna mapping for streams 1 through $S_n$ of codeword CW-n. The multiplier module 115 multiplies the outputs of the mapper module 114 by a channel estimate matrix H. The multiplier module 115 may obtain the channel estimate matrix based on channel gain of the received signals.

The subtractor module 117 receives the inputs received by the receive module 302-n, subtracts the output of the multiplier module 115 from the inputs, and outputs received signals without interference from codewords CW-1 through CW-n. That is, the subtractor module 117 outputs signals with interference from codewords CW-1 through CW-n cancelled from the received signals received by the receiver 300.

Throughout the present disclosure, codewords are referenced as CW-1 through CW-C. The order of processing the codewords, however, may not be sequential. The codewords can be processed in any order including sequentially. The order of processing the codewords can be based on factors including but not limited to channel quality of each codeword.

Receivers can utilize CRC information generated by the CRC check module (i.e., whether or not a codeword is decoded correctly and passes CRC) before performing successive interference cancellation. Two types of receivers are presented below: a parallel SIC receiver using CRC and a serial SIC receiver using CRC.

Figure 4A:
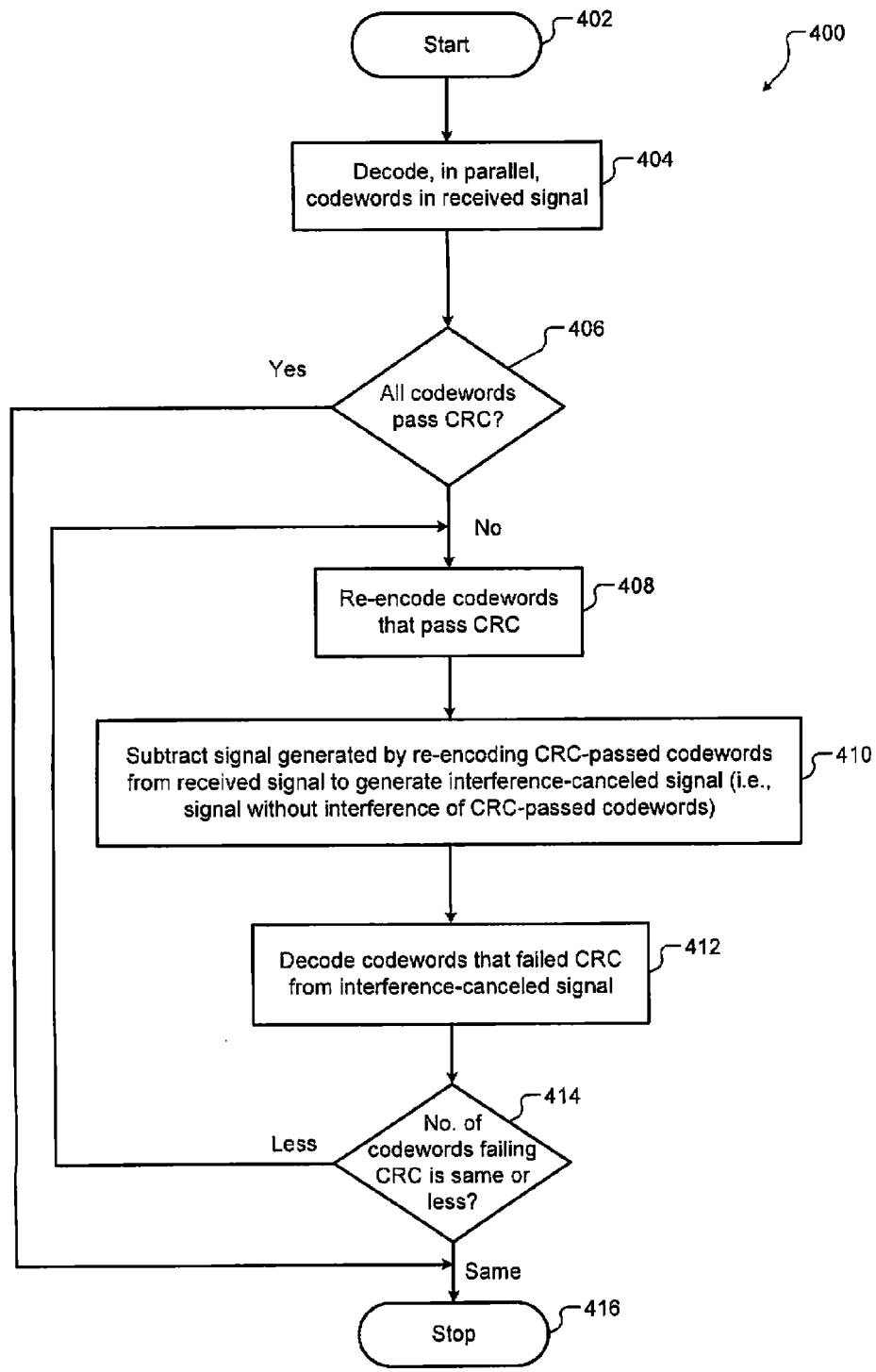
FIGS. 4A and 4B are flowcharts of methods for a parallel SIC receiver.
Figure 4B:
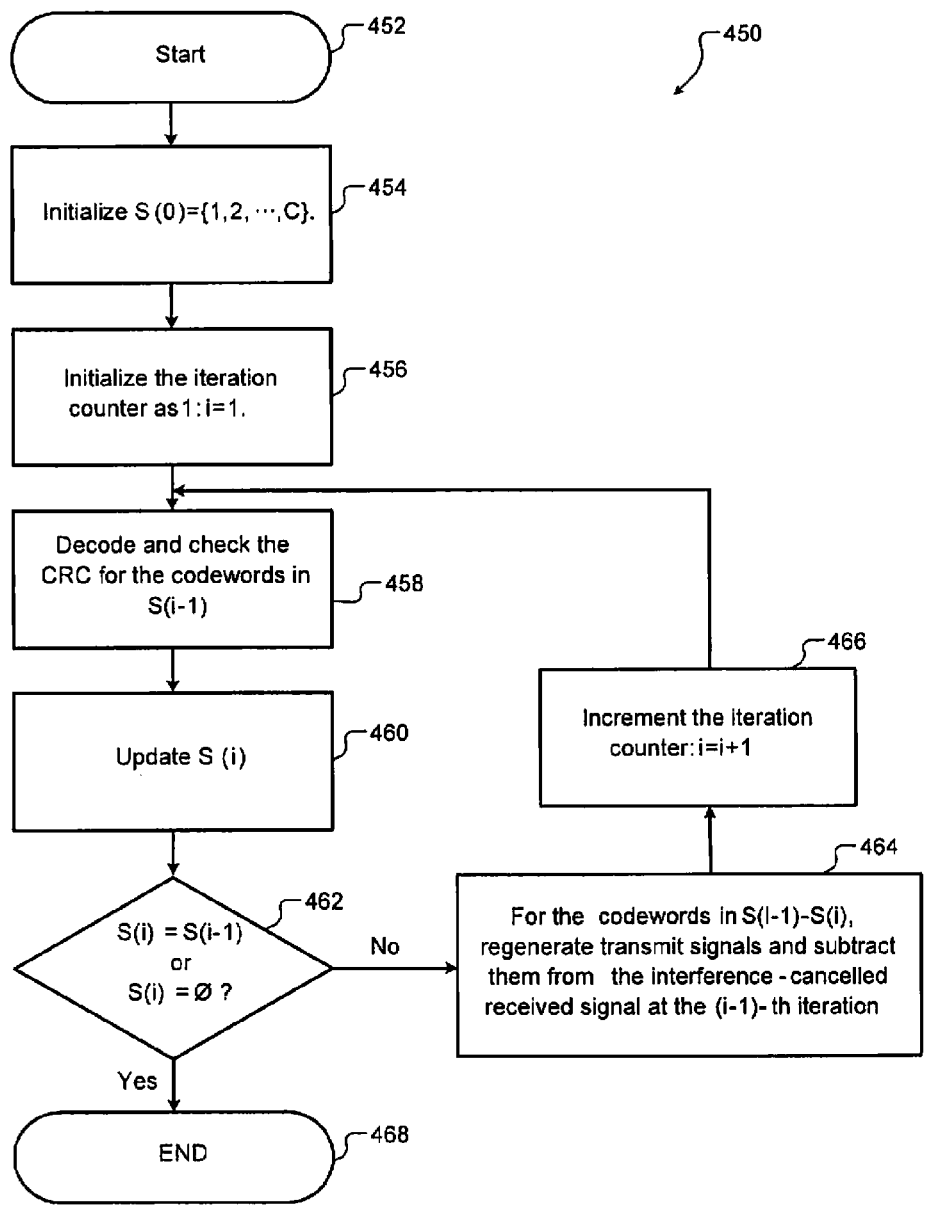
Figure 4C:
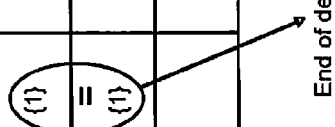
FIG. 4C is an example showing decoding of five codewords using a parallel SIC receiver according to the methods shown in FIGS. 4A and 4B.

Referring now to FIGS. 4A-4C, methods 400 and 450 for a parallel SIC receiver are shown. In FIG. 4A, the method 400 is shown. Control begins at 402. At 404, control decodes, in parallel, codewords in the received signal received by the parallel SIC receiver. At 406, control determines if all decoded codewords pass CRC. Control ends at 416 if all decoded codewords passed CRC.

At 408, if one or more but not all of the decoded codewords fails CRC, control re-encodes codewords that pass CRC. At 410, control subtracts a signal generated by re-encoding codewords that passed CRC from the received signal to generate an interference-canceled signal. The interference-canceled signal is a signal without interference of the codewords that passed CRC on the remaining codewords. At 412, control decodes codewords that failed CRC from the interference-canceled signal.

At 414, control determines if the number of codewords failing CRC in the current iteration is the same as or less than the number of codewords failing CRC in the previous iteration. Control returns to 408 if the number of codewords failing CRC in the current iteration is less than the number of codewords that failed CRC in the previous iteration. Control ends at 416 if codewords failing CRC in the current iteration is the same as the number of codewords that failed CRC in the previous iteration.

For example, consider a parallel SIC receiver that receives four codewords CW-1 through CW-4 (i.e., C=4) in the received signal and that the parallel SIC receiver decodes the four codewords CW-1 through CW-4 in parallel. Suppose that decoded codewords CW-1 and CW-4 pass CRC and that decoded codewords CW-2 and CW-3 fail CRC. Decoded codewords CW-1 and CW-4 that passed CRC are re-encoded, transmit signals using the re-encoded codewords CW-1 and CW-4 are regenerated, and the regenerated transmit signals are subtracted from the received signal to cancel interference of codewords CW-1 and CW-4 on codewords CW-2 and CW-3. Let the result of the subtraction be called a first interference-cancelled received signal.

Thereafter, the codewords CW2 and CW-3 that failed CRC are decoded from the first interference-cancelled received signal. Suppose that decoded codeword CW2 passes CRC because interference of codewords CW-1 and CW-4 was cancelled from the received signal. Suppose that the decoded codeword CW-3 failed CRC despite cancelling interference of codewords CW-1 and CW-4 from the received signal.

Next, the decoded codeword CW-2 that passed CRC is re-encoded, transmit signals using the re-encoded codeword CW-2 are regenerated, and the regenerated transmit signals are subtracted from the first interference-cancelled received signal to cancel the interference of the codeword CW-2 on codeword CW-3. Let the result of the subtraction be called a second interference-cancelled received signal.

Thereafter, the codeword CW-3 that failed CRC is decoded from the second interference-cancelled received signal. Decoded codeword CW-3 may pass CRC because interference of codewords CW-1, CW-2, and CW-4 was cancelled from the received signal. Decoding is complete and stopped if the decoded codeword CW-3 passes CRC since all of the four decoded codewords CW-1 through CW-4 have passed CRC.

Alternatively, the decoded codeword CW-3 may fail CRC despite cancelling interference of codewords CW-1, CW-2, and CW-4 from the received signal. Decoding is stopped if the decoded codeword CW-3 fails CRC since all codewords other than codeword CW-3 have passed CRC (i.e., are decoded successfully). In either case (i.e., whether codeword CW-3 passes or fails CRC), decoding is stopped since codewords failing CRC in the current iteration (i.e., codeword CW-3) is the same codeword that failed CRC in the previous iteration (where codeword CW-2 passed CRC but codeword CWC-3 failed CRC).

In FIG. 4B, the method 450 is shown. The method 450 is essentially the same as the method 400 but is shown using more general terms than the method 400. Control begins at 452. At 454, control initializes a set of codewords $S(0) = \{1, 2, \ldots, \text{and } C\}$. In general, $S(i)$ denotes a set of codewords that have not yet passed CRC after an $i^{th}$ iteration. At 456, control initializes an iteration count i=1. At 458, control decodes codewords in a set $S(i-1)$ and checks CRC of decoded codewords in the set $S(i-1)$. At 460, control updates set $S(i)$ by deleting codewords that passed CRC from the set $S(i-1)$.

At 462, control determines if $S(i)=S(i-1)$ (i.e., if the same codewords fail CRC in the $i^{th}$ iteration as in $(i-1)^{th}$ iteration) or if $S(i)$ is a null set (i.e., if all codewords passed CRC). At 464, if $S(i)$ is not the same as $S(i-1)$ or if $S(i)$ is not a null set, control re-encodes codewords in set $S(i-1)-S(i)$, regenerates transmit signals using the codewords in set $S(i-1)-S(i)$, and subtracts the regenerated transmit signals from the interference-cancelled received signal from the $(i-1)^{th}$ iteration. At 466, control increments the iteration count and returns to 458. Control ends at 468 if $S(i)$ is the same as $S(i-1)$ or if $S(i)$ is a null set.

FIG. 4C shows an example using five codewords (i.e., C=5), where four codewords pass CRC while one codeword eventually fails CRC. The example shown (and other examples) can be followed using the flowchart shown in FIG. 4B, by referring to the example explained above, and by referring to the examples explained below (following the description of FIG. 7). The example shown in FIG. 4C is therefore not explained further.

Figure 5:
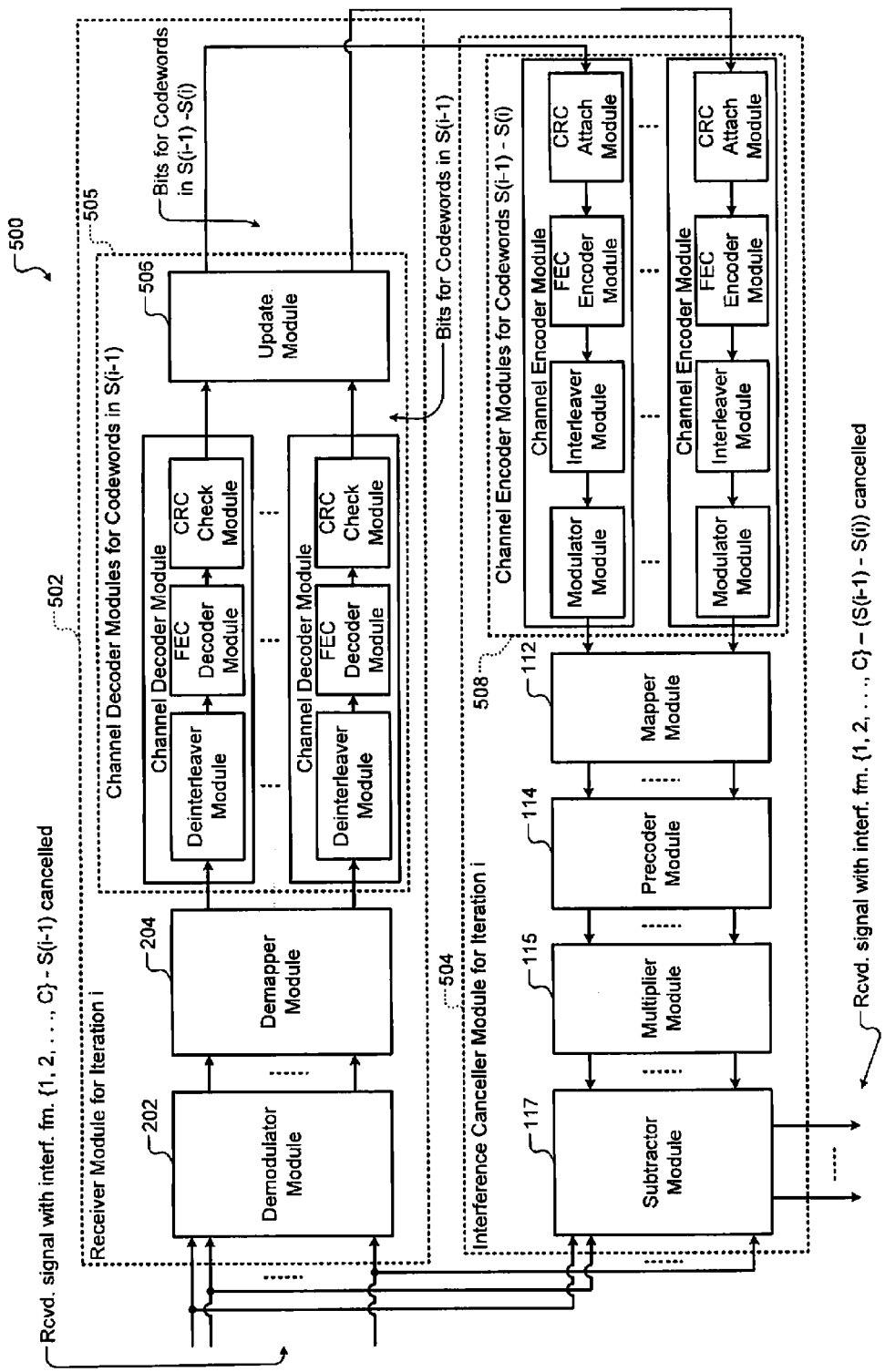
FIG. 5 is a functional block diagram of a parallel SIC receiver.

Referring now to FIG. 5, a portion of a parallel SIC receiver 500 using CRC is shown. While only one receiver module 502 and one interference canceller module 504 of the parallel SIC receiver 500 are shown, the parallel SIC receiver 500 includes a plurality of receiver modules and a plurality of interference canceller modules similar to the receiver module 502 and the interference canceller module 504. The receiver modules and the interference canceller modules of the parallel SIC receiver 500 are arranged in a manner similar to the receiver modules 302 and the interference canceller modules 304 of the receiver 300 shown in FIG. 3A. For convenience, only an iteration performed by the parallel SIC receiver 500 using the receiver module 502 and the interference canceller module 504 is shown in FIG. 5.

The receiver module 502 includes the demodulator module 202, the demapper module 204, a plurality of the channel decoder modules 505, which are similar to the channel decoder modules 206 shown in FIG. 2, and an update module 506. The demodulator module 202 operates as described with reference to FIG. 2 except that, in an $i^{th}$ iteration, only the codewords in the set $S(i-1)$ are demodulated. In general, the demodulator module 202 demodulates received signal with interference from codewords (CW-1 through CW-C minus codewords in set $S(i-1)$ (i.e., interference from codewords from iteration $(i-1)$)) cancelled. The demodulator module 202 generates bit LLRs for codewords in set $S(i-1)$.

The demapper module 204 operates as described with reference to FIG. 2. Based on the output of the demapper module 204, the channel decoder modules 505 decode codewords in set $S(i-1)$ and output information bits of the codewords in set $S(i-1)$. The update module 506 deletes codewords that passed CRC from set $S(i-1)$ to generate a set $S(i)$, which includes codewords from set $S(i-1)$ that failed CRC.

The interference canceller module 504 receives the information bits of the decoded codewords in set $(S(i-1)-S(i))$ (i.e., decoded codewords of set $S(i-1)$ that passed CRC). The interference canceller module 504 includes a plurality of channel encoder modules 508, which are similar to the channel encoder modules 102 shown in FIG. 1, the mapper module 112, the precoder module 114, the multiplier module 115, and the subtractor module 117.

The channel encoder modules re-encode the decoded codewords in the set $(S(i-1)-S(i))$ (i.e., decoded codewords of set $S(i-1)$ that passed CRC). Additionally, depending on the CRC information generated by the CRC check modules of the channel decoder modules 505, the receiver 500 sends an acknowledgement to the transmitter indicating which codewords are received correctly and transmits a retransmission request to the transmitter to retransmit the codewords that failed CRC.

The mapper module 112, the precoder module 114, the multiplier module 115, and the subtractor module 117 operate as described with reference to FIG. 3B. The subtractor module 117 receives the inputs received by the demodulator module 202, subtracts the output of the multiplier module 115 from the inputs, and outputs received signals without interference from codewords (CW-1 through CW-C minus codewords from the set (S(i−1)-S(i))). That is, the subtractor module 117 outputs signals with interference from codewords (CW-1 through CW-C minus codewords from the set (S(i−1)-S(i))) cancelled from the received signals received by the receiver module 502.

Figure 6A:
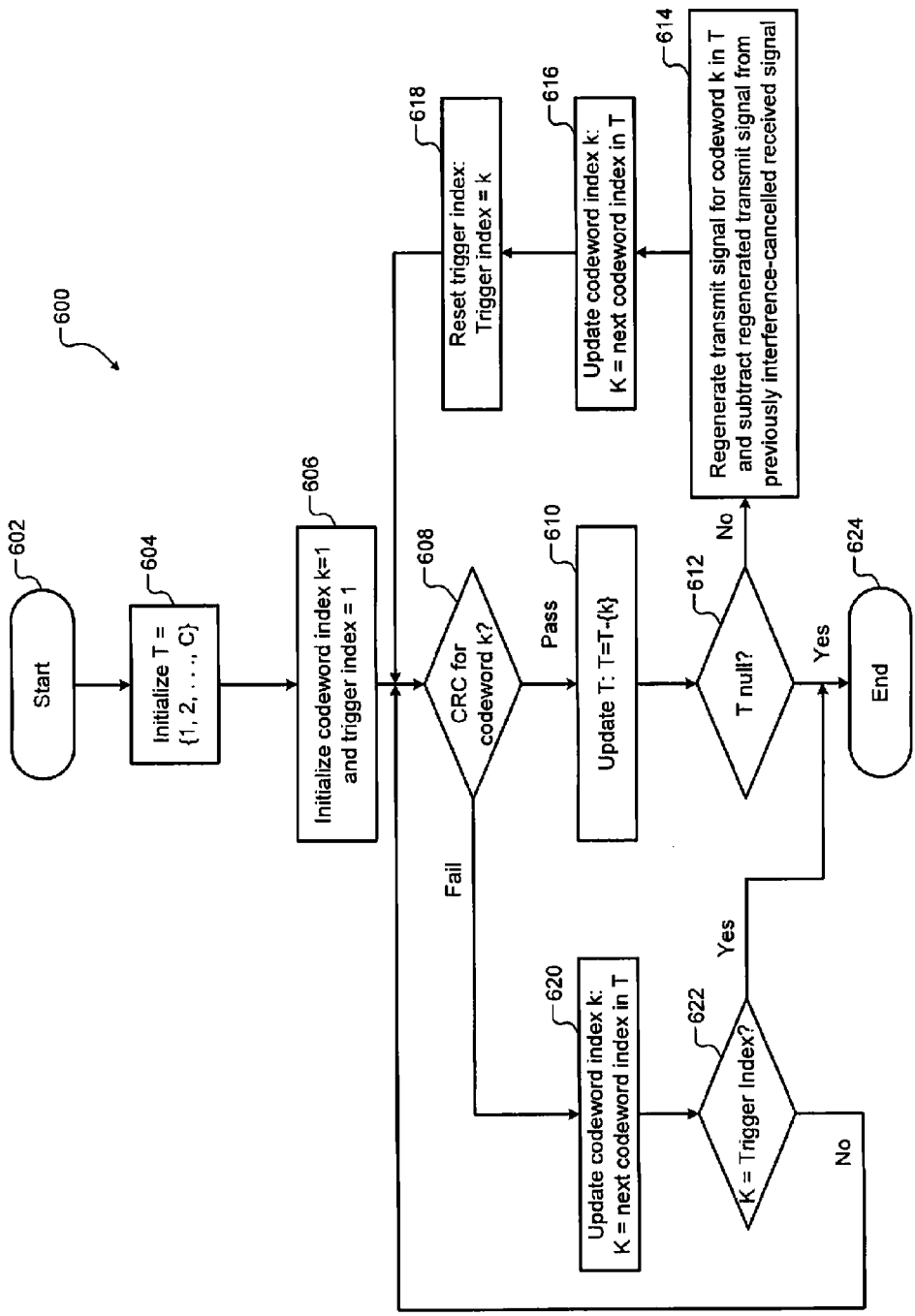
FIG. 6A is a flowchart of a method for a serial SIC receiver.

Referring now to FIGS. 6A and 6B, a method 600 for a serial SIC receiver is shown. Unlike in the parallel SIC receiver, in a serial SIC receiver, codewords are processed sequentially and therefore in an order (i.e., a sequence). An order of codewords can be determined based on factors including, but not limited to, channel gain of the codewords. Processing of codewords can begin with processing of the highest ordered codeword, where the highest ordered codeword is a codeword with the highest channel gain, for example. In the following discussion, codewords are assumed to be pre-arranged in an order, and only processing of the codewords subsequent to ordering is described. In some implementations, the codewords may not be ordered, and a codeword may be randomly selected for decoding.

In FIG. 6A, control begins at 602. At 604, control initializes an ordered set of codewords $T=\{1, 2, \ldots,$ and $C\}$ including codewords that have not yet passed CRC. At 606, control initializes a codeword index k as k=1 and a trigger index equal to 1. The codeword index k is an index of next element (codeword) in the ordered set T and is incremented sequentially after decoding each codeword regardless of whether the decoded codeword passes or fails CRC. The trigger index is a codeword index of a codeword in the set T to be decoded next. The trigger index is updated each time a decoded codeword passes CRC and is updated to the codeword index of the codeword to be decoded next.

At 608, control decodes codeword k and checks CRC of decoded codeword k in the set T. At 610, if the decoded codeword k passes CRC, control updates the set T by deleting from the set T the codeword k that passed CRC (i.e., T=T−{k}). At 612, control determines if the set T is a null set (i.e., if all codewords in the set T passed CRC). At 614, if all codewords in the set T have not yet passed CRC, control regenerates transmit signals for the decoded codeword k in the set T that passed CRC, and subtracts the regenerated transmit signals from previously interference-cancelled received signal. At 616, control updates the codeword index k to a codeword index of the next codeword to be decoded in the set T. At 618, control resets the trigger index as trigger index=k (i.e., codeword index of the next to be decoded in the set T), and control returns to 608.

At 620, if the decoded codeword k fails CRC, control updates the codeword index k to a codeword index of the next codeword to be decoded in the set T. Control does not perform transmission signal regeneration and interference cancellation since the decoded codeword k failed CRC. At 622, control determines if the codeword index k is equal to the trigger index. At 624, control stops decoding if the codeword index k is equal to the trigger index. That is, control stops decoding if none of the previously failed codewords passed CRC. Control returns to 608 if the codeword index k is not equal to the trigger index. Thus, transmission signal regeneration and interference cancellation are performed only for codewords that pass CRC.

For example, consider a serial SIC receiver that receives four codewords CW-1 through CW-4 (i.e., C=4) in the received signal and that the serial SIC receiver decodes the four codewords CW-1 through CW-4 serially. Assume that the codewords CW1-1 through CW-4 are ordered and that codeword CW-1 is the most reliable codeword and is therefore selected for decoding first. The following discussion is for the example also applies when the codewords CW-1 through CW-4 are not ordered and when the codeword CW-1 is randomly selected for decoding first.

Suppose that the decoded codeword CW-1 passes CRC. The decoded codeword CW-1 that passed CRC is re-encoded, transmit signals using the re-encoded codeword CW-1 are regenerated, and the regenerated transmit signals are subtracted from the received signal to cancel the interference of codeword CW-1 on the remaining codewords CW-2 through CW-4. Let the result of the subtraction be called a first interference-cancelled received signal.

Thereafter, codeword CW-2 is decoded from the first interference-cancelled received signal. Suppose that the decoded codeword CW-2 fails CRC. Transmit signal regeneration and interference cancellation are not performed using decoded codeword CW-2 since codeword CW-2 failed CRC. Instead, codeword CW-3 is decoded from the first interference-cancelled received signal.

Suppose that the decoded codeword CW-3 passes CRC. The decoded codeword CW-3 that passed CRC is re-encoded, transmit signals using the re-encoded codeword CW-3 are regenerated, and the regenerated transmit signals are subtracted from the first interference-cancelled received signal to cancel the interference of codeword CW-3 on the remaining codewords (i.e., codeword CW-2 that failed CRC previously and codeword CW-4). Let the result of the subtraction be called a second interference-cancelled received signal.

Thereafter, codeword CW-4 is decoded from the second interference-cancelled received signal. Suppose that the decoded codeword CW-4 fails CRC. Transmit signal regeneration and interference cancellation are not performed using decoded codeword CW-4 since codeword CW-4 failed CRC. Instead, codeword CW-2 is decoded from the second interference-cancelled received signal.

Suppose that the decoded codeword CW-2 passes CRC. Then the decoded codeword CW-2 that passed CRC is re-encoded, transmit signals using the re-encoded codeword CW-2 are regenerated, and the regenerated transmit signals are subtracted from the second interference-cancelled received signal to cancel the interference of codeword CW-2 on the remaining codewords (i.e., codeword CW-4 that failed CRC previously). Let the result of the subtraction be called a third interference-cancelled received signal.

Thereafter, codeword CW-4 is decoded from the third interference-cancelled received signal. The decoding is stopped after decoding the codeword CW-4 if the decoded codeword CW-4 passes CRC since all the codewords have passed CRC. The decoding is also stopped if the decoded codeword CW-4 fails CRC since no additional codeword passed CRC with which to perform interference cancellation and retry decoding the codeword CW-4.

Suppose, however, that when codeword CW-2 is decoded from the second interference-cancelled received signal, the decoded codeword CW-2 fails CRC. The decoding is stopped after decoding the codeword CW-2. Decoding of the codeword CW-4, which failed CRC previously, is not attempted again since no additional codeword passed CRC (e.g., codeword CW-2 failed) with which to perform interference cancellation and retry decoding the codeword CW-4.

FIG. 6B shows an example of serial SIC receiver using five codewords (i.e., C=5), where four codewords pass CRC while one codeword eventually fails CRC. The example shown (and other examples) can be followed using the flowchart shown in FIG. 6A, by referring to the example explained above, and by referring to the examples explained below (following the description of FIG. 7). The example shown in FIG. 6B is therefore not explained further. An asterisk (*) indicates that codeword CW-4 with y-$H_2x_2$ has to pass CRC since the codeword CW-4 can pass CRC even with y, as can be seen in the parallel SIC receiver (assuming perfect channel estimation).

Figure 7:
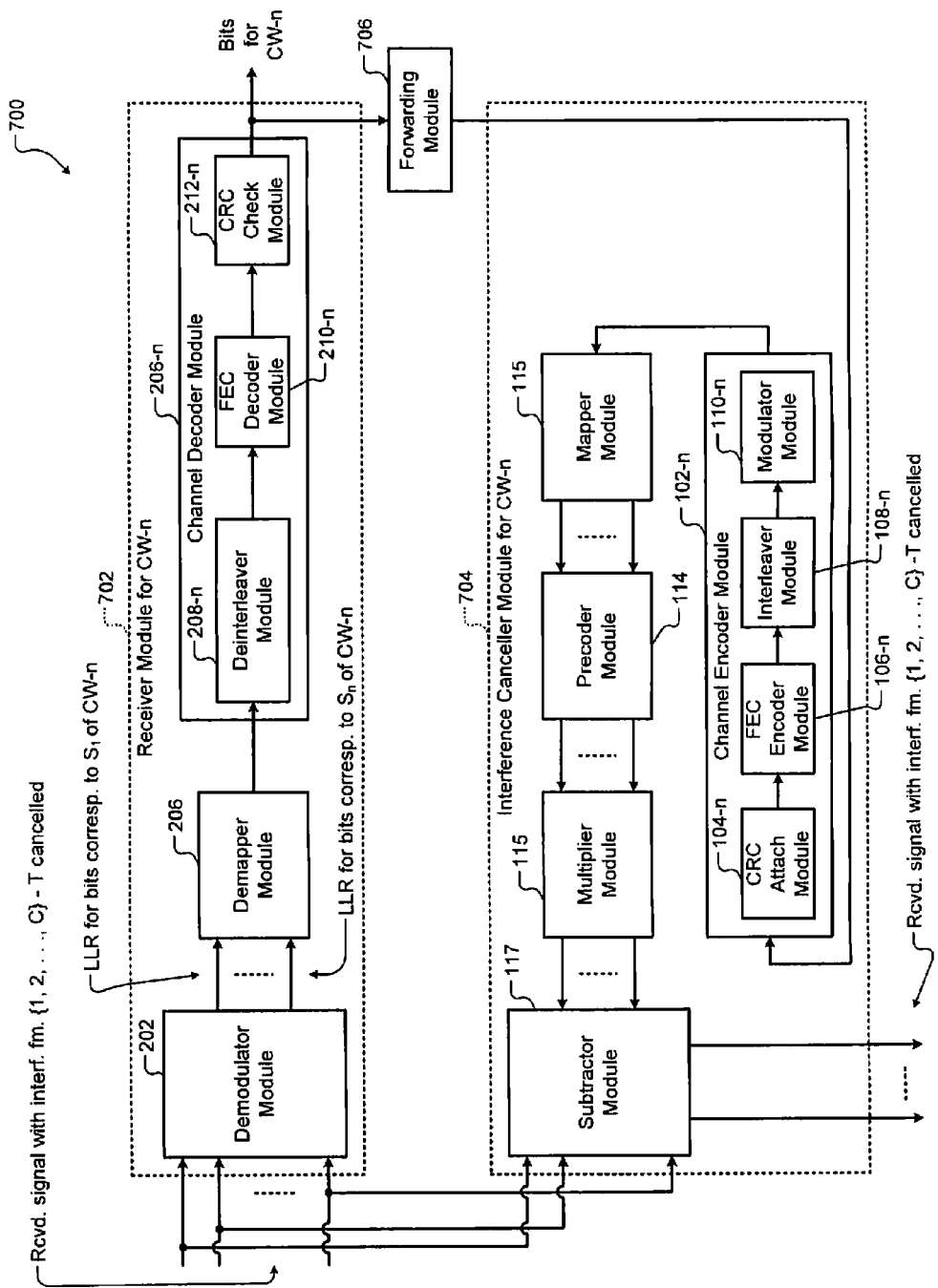
FIG. 7 is a functional block diagram of a serial SIC receiver.

Referring now to FIG. 7, a portion of a serial SIC receiver 700 using CRC is shown. While only one receiver module 702 and one interference canceller module 704 of the serial SIC receiver 700 are shown, the serial SIC receiver 700 includes a plurality of receiver modules and a plurality of interference canceller modules similar to the receiver module 702 and the interference canceller module 704. The receiver modules and the interference canceller modules of the serial SIC receiver 700 are arranged in a manner similar to the receiver modules 302 and the interference canceller modules 304 of the receiver 300 shown in FIG. 3A.

The receiver module 702 includes the demodulator module 202, the demapper module 204, and a channel decoder module 206-$n$, which is similar to the channel decoder modules 206 shown in FIG. 2. The channel decoder module 206-$n$ includes a deinterleaver module 208-$n$, a FEC decoder module 210-$n$, and a CRC check module 212-$n$, which are similar to the deinterleaver modules 208, the FEC decoder modules 210, and the CRC check modules 212, respectively.

The demodulator module 202 operates as described with reference to FIG. 2 except that only one codeword in set T is demodulated at a time. In general, the demodulator module 202 demodulates received signal with interference from codewords (CW-1 through CW-C minus codewords in set T (i.e., codewords that have not yet passed CRC)) cancelled. In other words, the input signal to the demodulator module 202 does not include interference of codewords in set T that passed CRC on remaining codewords. The demodulator module 202 demodulates streams 1 through $S_n$ of the codeword CW-n and generates bit LLRs corresponding to each of the streams 1 through $S_n$ of the codeword CW-n.

The demapper module 204 operates as described with reference to FIG. 2. Based on the output of the demapper module 204, the channel decoder module 206-$n$ decodes codeword CW-n from inputs received by the demodulator module 202. The channel decoder module 206-$n$ outputs information bits of the codeword CW-n. The CRC check module 212-$n$ of the channel decoder module 206-$n$ determines whether the decoded codeword CW-n passed CRC. The forwarding module 706 forwards codeword CW-n to the interference canceller module 704 if the codeword CW-n passed CRC.

The interference canceller module 704 includes a channel encoder module 102-$n$, which is similar to the channel encoder modules 102 shown in FIG. 1, the mapper module 112, the precoder module 114, the multiplier module 115, and the subtractor module 117. The channel encoder module 102-$n$ includes a CRC attach module 104-$n$, a FEC encoder module 106-$n$, an interleaver module 108-$n$, and a modulator module 110-$n$, which are similar to the CRC attach modules 104, the FEC encoder modules 106, the interleaver modules 108, and the modulator modules 110, respectively.

The channel encoder module 102-$n$ re-encodes the codeword CW-n. Additionally, depending on the CRC information generated by the CRC check module 212-$n$ of the channel decoder module 206-$n$, the receiver 700 sends an acknowledgement to the transmitter indicating that the codeword CW-n is received correctly and transmits a retransmission request to the transmitter to retransmit codeword CW-n if the codeword CW-n failed CRC.

The mapper module 112, the precoder module 114, the multiplier module 115, and the subtractor module 117 operate as described with reference to FIG. 3B. The subtractor module 117 receives the inputs received by the demodulator module 202, subtracts the output of the multiplier module 115 from the inputs, and outputs received signals without interference from the codeword CW-n. That is, the subtractor module 117 outputs signals with interference from codewords (CW-1 through CW-C minus codeword CW-n) cancelled from received signals received by the receiver module 702.

A comparison of the parallel SIC receiver and the serial SIC receiver is now presented. For simplicity, the number of codewords decoded by each decoder is assumed to be two (i.e., C=2). In the parallel SIC decoder, in step 1, demodulation and decoding for two codewords are performed (i.e., 2 decoding operations). In step 2, the CRC for each codeword is checked.

In step 3$a$, whether both codewords pass CRC or both codewords fail CRC is determined, and the decoding is then stopped. A probability of both codewords passing CRC or both codewords failing CRC is $(0.9^2+0.1^2)=82\%$, where 0.9 is a probability that only one of the two codewords passes CRC, and 0.1 is a probability that only one of the two codewords fails CRC. Alternatively, in step 3$b$, if only one of the two codewords passes CRC, then the decoded codeword that passes CRC is re-encoded and interference of the codeword that passes CRC on the received signal is canceled. A probability of only one of the two codewords passing CRC is $(0.9 \times 0.1+0.1 \times 0.9)=18\%$.

In step 4, demodulation and decoding for the codeword that failed in the previous decoding operation are performed (i.e., 1 decoding operation). Thus, average number of decoding operations per two-codeword transmission received by the parallel SIC receiver is $(2+1 \times 0.18)=2.18$. The parallel SIC decoder uses two decoders to decode two codewords and performs up to four decoding operations in two time periods.

In the serial SIC decoder, the two codewords are assumed to be ordered. In step 1, demodulation and decoding for the first codeword are performed (i.e., 1 decoding operation). In step 2, CRC for the first codeword is checked. In step 3$a$, if the first codeword passes CRC, then the transmit signal regeneration and interference cancellation are performed for the first codeword, followed by decoding of the second codeword (i.e., 1 decoding operation). The probability that the first codeword passes CRC is 90%. The probability is 90% when the two codewords are not ordered and when the first codeword is selected randomly. The probability can increase if the codewords are ordered and if the first codeword is selected based on the ordering as the more reliable of the two codewords.

In step 3$b$, if the first codeword fails, the second codeword is decoded, and CRC is performed for the second codeword (i.e., 1 decoding operation). The probability that the first codeword fails CRC is 10%. Again, the probability is a function of ordering of the codewords. In step 3$b$-1, if the second codeword passes CRC, then the transmit signal regeneration and interference cancellation are performed for the second codeword, and then the first codeword is decoded (i.e., 1 decoding operation). The probability that the second codeword passes CRC is 9%. In step 3$b$-2, if the second codeword also fails CRC, then decoding ends. The probability that the second codeword also fails CRC is 1%. Thus, the average number of decoding operations per two-codeword transmission received by the serial SIC receiver is $(2+1 \times 0.09)=2.09$. The average number of decoding operations can be further reduced if codeword ordering is employed before step 1. Ordering codewords, however, increases complexity of the serial SIC receiver.

The serial SIC receiver uses only one decoder to decode two codewords while the parallel SIC receiver uses two decoders to decode two codewords. The serial SIC receiver decodes two codewords by performing up to three decoding operations serially while the parallel SIC receiver decodes two codewords by performing up to four decoding operations using two decoders in parallel. Thus, the serial SIC receiver may perform less number of decoding operations than the parallel SIC receiver, and the number of decoding operations in the serial SIC receiver may depend on the ordering of the codewords. Further, the serial SIC receiver performs the three decoding operations in three time units while the parallel SIC receiver performs the four decoding operations in two time units. Accordingly, the serial SIC receiver has a greater latency than the parallel SIC receiver, and the latency of the serial SIC receiver is proportional to the number of codewords decoded serially.

The teachings of the present disclosure can be extended and applied to other systems. For example, in systems using automatic repeat request (ARQ) or hybrid ARQ (HARQ) error control, a receiver may perform HARQ combining before performing decoding according to the present disclosure. In $3^{rd}$ generation partnership project (3GPP) long term evolution (LTE) systems, a codeword includes one or more concatenated code blocks, and each code block includes CRC. The teachings of the present disclosure can be applied to the 3GPP LTE systems by treating each code block as a codeword and by decoding code blocks in parallel or serially. The teachings of the present disclosure can also be applied to systems that use hard decoding instead of or in addition to LLR-based soft decoding. Additional implementations and extensions to other systems are contemplated.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
   a first receiver module configured to
      receive a first signal, wherein the first signal includes a plurality of codewords,
      generate log likelihood ratios for the codewords, wherein a log likelihood ratio indicates whether an encoded bit in a codeword is a 1 or a 0,
      generate a first set of decoded codewords by decoding the plurality of codewords based on respective log likelihood ratios, and
      determine if any decoded codeword of the first set of decoded codewords fails cyclic redundancy check;
   a first interference canceller module configured to
      generate a second signal based on a first decoded codeword from the first set of decoded codewords in response to (i) any decoded codeword of the first set of decoded codewords failing cyclic redundancy check and (ii) the first decoded codeword passing cyclic redundancy check, and
      by subtracting the second signal from the first signal, (i) cancel interference of a first codeword, which corresponds to the first decoded codeword, on a second set of codewords and (ii) generate a third signal,
      wherein the second set of codewords (i) includes the plurality of codewords and (ii) excludes the first codeword, and
      wherein the third signal includes the second set of codewords;
   a second receiver module configured to
      receive the third signal,
      generate a third set of decoded codewords by decoding the second set of codewords from the third signal, and
      determine if any decoded codeword of the third set of decoded codewords fails cyclic redundancy check; and
   a second interference canceller module configured to
      generate a fourth signal based a second decoded codeword from the third set of decoded codewords in response to
         any decoded codeword of the third set of decoded codewords failing cyclic redundancy check,
         the second decoded codeword passing cyclic redundancy check, and
         the third set of decoded codewords being different than the first set of decoded codewords, and
      by subtracting the fourth signal from the third signal, (i) cancel interference of a second codeword, which corresponds to the second decoded codeword, on a fourth set of codewords and (ii) generate a fifth signal,
      wherein the fourth set of codewords (i) includes the second set of codewords and (ii) excludes the second codeword, and
      wherein the fifth signal includes the fourth set of codewords.

2. The system of claim 1, wherein the first receiver module is configured to receive the first signal via a plurality of receive antennas arranged in a multiple-input multiple-output configuration, and wherein the first receiver module includes:
   a plurality of decoder modules configured to decode the plurality of codewords in parallel, a number of decoder modules in the plurality of decoder modules being equal to a number of codewords in the plurality of codewords; and
   a plurality of cyclic redundancy check modules configured to perform cyclic redundancy check on the first set of decoded codewords in parallel, wherein the first receiver module is configured to generate a request to retransmit the first codeword in response to the first decoded codeword failing the cyclic redundancy check.

3. A system comprising:
   a first receiver module configured to
      receive a first signal, wherein the first signal includes a plurality of codewords,
      generate a first log likelihood ratio for a first codeword from the plurality of codewords, wherein a log likelihood ratio indicates whether an encoded bit in a codeword is a 1 or a 0,
      generate a first decoded codeword by decoding the first codeword from the plurality of codewords based on the first log likelihood ratio, and
      determine whether the first decoded codeword passes cyclic redundancy check;
   a first interference canceller module configured to
      generate a second signal based on the first decoded codeword in response to the first decoded codeword passing cyclic redundancy check, and
      by subtracting the second signal from the first signal, (i) cancel interference of the first codeword on a first set of codewords and (ii) generate a third signal, wherein the first set of codewords (i) includes the plurality of codewords and (ii) excludes the first codeword, and wherein the third signal (i) includes the plurality of codewords and (ii) excludes the first codeword;

a second receiver module configured to receive (i) the first signal in response to the first decoded codeword failing the cyclic redundancy check or (ii) the third signal in response to the first decoded codeword passing the cyclic redundancy check, generate a second log likelihood ratio for a second codeword from the plurality of codewords in (i) the first signal or (ii) the third signal, generate a second decoded codeword by decoding the second codeword from the plurality of codewords based on the second log likelihood ratio, and determine whether the second decoded codeword passes cyclic redundancy check; and a second interference canceller module configured to generate a fourth signal based on the second decoded codeword in response to the second decoded codeword passing cyclic redundancy check, and by subtracting the fourth signal from the first signal or the third signal, (i) cancel interference of the second codeword on a second set of codewords and (ii) generate a fifth signal, wherein the second set of codewords (i) includes the plurality of codewords, (ii) excludes the second codeword, and (iii) excludes the first codeword if the first decoded codeword passed cyclic redundancy check, and wherein the fifth signal (i) includes the plurality of codewords, (ii) excludes the second codeword, and (iii) excludes the first codeword if the first decoded codeword passed cyclic redundancy check.

4. The system of claim 3, wherein in response to (i) the first decoded codeword and the second decoded codeword failing the cyclic redundancy check and (ii) the second codeword being last of the plurality of codewords, the second receiver module is configured to:

generate a third decoded codeword by re-decoding the first codeword, determine whether the third decoded codeword passes cyclic redundancy check, and not generate a fourth decoded codeword by re-decoding the second codeword in response to the third decoded codeword failing cyclic redundancy check.

5. The system of claim 3, wherein the first receiver module is configured to receive the first signal via a plurality of receive antennas arranged in a multiple-input multiple-output configuration, and wherein the first receiver module includes:

a decoder module configured to decode the first codeword; and a cyclic redundancy check module configured to (i) perform cyclic redundancy check on the first decoded codeword and (ii) generate a request to retransmit the first codeword in response to the first decoded codeword failing the cyclic redundancy check.

6. The system of claim 3, wherein the first receiver module is configured to:

arrange codewords in the plurality of codewords in a descending order using an ordering metric, wherein the ordering metric includes channel quality, and select one of the codewords having highest channel quality as the first codeword.

7. A method comprising:

receiving a first signal, wherein the first signal includes a plurality of codewords;

generating log likelihood ratios for the codewords, wherein a log likelihood ratio indicates whether an encoded bit in a codeword is a 1 or a 0;

generating a first set of decoded codewords by decoding the plurality of codewords based on respective log likelihood ratios;

determining if any decoded codeword of the first set of decoded codewords fails cyclic redundancy check;

generating a second signal based on a first decoded codeword from the first set of decoded codewords in response to (i) any decoded codeword of the first set of decoded codewords failing cyclic redundancy check and (ii) the first decoded codeword passing cyclic redundancy check;

by subtracting the second signal from the first signal, (i) canceling interference of a first codeword, which corresponds to the first decoded codeword, on a second set of codewords and (ii) generating a third signal, wherein the second set of codewords (i) includes the plurality of codewords and (ii) excludes the first codeword, and wherein the third signal includes the second set of codewords;

receiving the third signal;

generating a third set of decoded codewords by decoding the second set of codewords from the third signal;

determining if any decoded codeword of the third set of decoded codewords fails cyclic redundancy check;

generating a fourth signal based a second decoded codeword from the third set of decoded codewords in response to any decoded codeword of the third set of decoded codewords failing cyclic redundancy check, the second decoded codeword passing cyclic redundancy check, and the third set of decoded codewords being different than the first set of decoded codewords; and by subtracting the fourth signal from the third signal, (i) canceling interference of a second codeword, which corresponds to the second decoded codeword, on a fourth set of codewords and (ii) generating a fifth signal, wherein the fourth set of codewords (i) includes the second set of codewords and (ii) excludes the second codeword, and wherein the fifth signal includes the fourth set of codewords.

8. The method of claim 7, further comprising:

receiving the first signal via a plurality of receive antennas arranged in a multiple-input multiple-output configuration;

decoding the plurality of codewords in parallel using a plurality of decoder modules, wherein a number of decoder modules in the plurality of decoder modules is equal to a number of codewords in the plurality of codewords;

performing cyclic redundancy check on the first set of decoded codewords in parallel using a plurality of cyclic redundancy check modules; and generating a request to retransmit the first codeword in response to the first decoded codeword failing the cyclic redundancy check.

9. A method comprising:

receiving a first signal, wherein the first signal includes a plurality of codewords;

generate a first log likelihood ratio for a first codeword from the plurality of codewords, wherein a log likelihood ratio indicates whether an encoded bit in a codeword is a 1 or a 0;

generating a first decoded codeword by decoding the first codeword from the plurality of codewords based on the first log likelihood ratio;

determining whether the first decoded codeword passes cyclic redundancy check;

generating a second signal based on the first decoded codeword in response to the first decoded codeword passing cyclic redundancy check;

by subtracting the second signal from the first signal, (i) canceling interference of the first codeword on a first set of codewords and (ii) generating a third signal, wherein the first set of codewords (i) includes the plurality of codewords and (ii) excludes the first codeword, and wherein the third signal (i) includes the plurality of codewords and (ii) excludes the first codeword;

receiving (i) the first signal in response to the first decoded codeword failing the cyclic redundancy check or (ii) the third signal in response to the first decoded codeword passing the cyclic redundancy check;

generating a second log likelihood ratio for a second codeword from the plurality of codewords in (i) the first signal or (ii) the third signal;

generating a second decoded codeword by decoding the second codeword from the plurality of codewords based on the second log likelihood ratio;

determining whether the second decoded codeword passes cyclic redundancy check;

generating a fourth signal based on the second decoded codeword in response to the second decoded codeword passing cyclic redundancy check; and by subtracting the fourth signal from the first signal or the third signal, (i) canceling interference of the second codeword on a second set of codewords and (ii) generating a fifth signal, wherein the second set of codewords (i) includes the plurality of codewords, (ii) excludes the second codeword, and (iii) excludes the first codeword if the first decoded codeword passed cyclic redundancy check, and wherein the fifth signal (i) includes the plurality of codewords, (ii) excludes the second codeword, and (iii) excludes the first codeword if the first decoded codeword passed cyclic redundancy check.

10. The method of claim 9, further comprising, in response to (i) the first decoded codeword and the second decoded codeword failing the cyclic redundancy check and (ii) the second codeword being last of the plurality of codewords:

generating a third decoded codeword by re-decoding the first codeword;

determining whether the third decoded codeword passes cyclic redundancy check; and not generating a fourth decoded codeword by re-decoding the second codeword in response to the third decoded codeword failing cyclic redundancy check.

11. The method of claim 9, further comprising:

receiving the first signal via a plurality of receive antennas arranged in a multiple-input multiple-output configuration;

decoding the first codeword using a decoder module configured;

performing cyclic redundancy check on the first decoded codeword using a cyclic redundancy check module; and generating a request to retransmit the first codeword in response to the first decoded codeword failing the cyclic redundancy check.

12. The method of claim 9, further comprising:

arranging codewords in the plurality of codewords in a descending order using an ordering metric, wherein the ordering metric includes channel quality; and selecting one of the codewords having highest channel quality as the first codeword.

\* \* \* \* \*